(12) United States Patent  (10) Patent No.: US 7,561,521 B2
Meier et al.  (45) Date of Patent: Jul. 14, 2009

(54) NETWORK CENTRIC QUALITY OF SERVICE USING ACTIVE NETWORK TECHNOLOGY

(75) Inventors: John L. Meier, St. Charles, MO (US); Kent L. English, St. Charles, MO (US); Arun Ayyagari, Seattle, WA (US); Guijun Wang, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 708 days.

(21) Appl. No.: 11/008,372

(22) Filed: Dec. 9, 2004

(65) Prior Publication Data

US 2006/0126504 A1  Jun. 15, 2006

(51) Int. Cl.
*H04L 12/26* (2006.01)

(52) U.S. Cl. .................................. 370/235; 370/395.4

(58) Field of Classification Search ......... 370/352–358, 370/389, 391, 392, 395.4, 395.41, 395.43, 370/401, 402, 232, 235, 386, 395.21, 395.42
See application file for complete search history.

(56) References Cited

U.S. PATENT DOCUMENTS

| | | | |
|---|---|---|---|
| 5,440,723 A | | 8/1995 | Arnold et al. |
| 6,286,052 B1 * | | 9/2001 | McCloghrie et al. ........ 709/238 |
| 6,295,285 B1 | | 9/2001 | Whitehead |
| 6,331,986 B1 | | 12/2001 | Mitra et al. |
| 6,377,548 B1 | | 4/2002 | Chuah |
| 6,430,154 B1 * | | 8/2002 | Hunt et al. ............... 370/230.1 |
| 6,442,158 B1 | | 8/2002 | Beser |
| 6,452,915 B1 | | 9/2002 | Jorgensen |
| 6,459,682 B1 | | 10/2002 | Ellesson et al. |
| 6,578,147 B1 | | 6/2003 | Shanklin et al. |
| 6,590,885 B1 | | 7/2003 | Jorgensen |
| 6,594,246 B1 | | 7/2003 | Jorgensen |
| 6,674,718 B1 * | | 1/2004 | Heddes et al. ............... 370/230 |
| 6,680,922 B1 | | 1/2004 | Jorgensen |
| 6,711,141 B1 * | | 3/2004 | Rinne et al. ................. 370/328 |
| 6,744,767 B1 | | 6/2004 | Chiu et al. |
| 6,862,622 B2 | | 3/2005 | Jorgensen |
| 7,020,143 B2 * | | 3/2006 | Zdan ..................... 370/395.21 |
| 7,283,536 B2 * | | 10/2007 | Ruutu et al. ................. 370/400 |
| 2002/0057651 A1 | | 5/2002 | Roberts |
| 2004/0136379 A1 | | 7/2004 | Liao et al. |
| 2004/0230695 A1 * | | 11/2004 | Anschutz et al. ............ 709/232 |
| 2005/0286559 A1 * | | 12/2005 | Miernik et al. ............... 370/468 |

OTHER PUBLICATIONS

PCT International Search Report, PCT/US 2005/043892, mailed on Apr. 7, 2006, 13 pages.
Dobson, et al., "Lightweight Databases", Computing and Information Systems Department; http://www.igd.fhg.de/archive/1995_www95/procedings/papers. pp. 1-7, 1995.

* cited by examiner

*Primary Examiner*—Brenda Pham

(57) ABSTRACT

Systems and methods for improving network centric quality of service using active network technology are disclosed. In one embodiment, a method includes controlling how a packet is passed over at least one of the interfaces using a differentiated services portion of a network management architecture, monitoring a request for a Quality of Service (QoS) level from at least one QoS-aware application, and adjusting at least one service rate of packet travel controlled by the differentiated services portion based on at least one of the requested QoS level and an available bandwidth. In an alternate embodiment, the controlling of how a packet is passed over at least one of the interfaces includes using at least one of a queuing discipline, a class, and a filter.

19 Claims, 3 Drawing Sheets

NETWORK CENTRIC QUALITY OF SERVICE USING ACTIVE NETWORK TECHNOLOGY

CROSS REFERENCE TO RELATED APPLICATIONS

This patent application is related to co-pending, commonly-owned U.S. patent application Ser. No. 60/634,489 entitled "Methods and Systems for Intelligent Network Management" filed on Dec. 9th, 2004, which application is incorporated herein by reference.

FIELD OF THE INVENTION

This invention relates to computer networks, and more specifically, to improving network centric quality of service using active network technology.

BACKGROUND OF THE INVENTION

Quality of service (QoS) is desired by most customers operating in a network centric organization (NCO). Traditional networks are based on destination-based routing and typically do not actively manage network resources (e.g., bandwidth (BW), routers, etc.) in determining resource allocation. Over-provisioning of the network to satisfy end-to-end user and application QoS requirements is not feasible for technical and economical reasons. Thus, there is a need for network management systems that better account for the dynamic link state and bandwidth characteristics in dynamic mobile environments.

SUMMARY OF THE INVENTION

The present invention is directed to methods and systems for improving network centric quality of service using active network technology. Embodiments of methods and systems in accordance with the present invention may better account for the dynamic link state and bandwidth characteristics in dynamic mobile environments.

In one embodiment, a method of managing a network having a plurality of interfaces includes controlling how a packet is passed over at least one of the interfaces using a differentiated services portion of a network management architecture, monitoring a request for a Quality of Service (QoS) level from at least one QoS-aware application, and adjusting at least one service rate of packet travel controlled by the differentiated services portion based on at least one of the requested QoS level and an available bandwidth. In an alternate embodiment, the controlling of how a packet is passed over at least one of the interfaces includes using at least one of a queuing discipline, a class, and a filter. In another embodiment, the adjusting of at least one service rate of packet travel includes notifying a kernel portion of a variation in the available bandwidth, and effecting a change in control of the packet rate of travel by the differentiated services portion.

BRIEF DESCRIPTION OF THE DRAWINGS

Preferred and alternate embodiments of the present invention are described in detail below with reference to the following drawings.

DETAILED DESCRIPTION

The present invention relates to methods and systems for improving network centric quality of service using active network technology. Many specific details of certain embodiments of the invention are set forth in the following description and in FIGS. 1-3 to provide a thorough understanding of such embodiments. One skilled in the art, however, will understand that the present invention may have additional embodiments, or that the present invention may be practiced without several of the details described in the following description.

Figure 1:
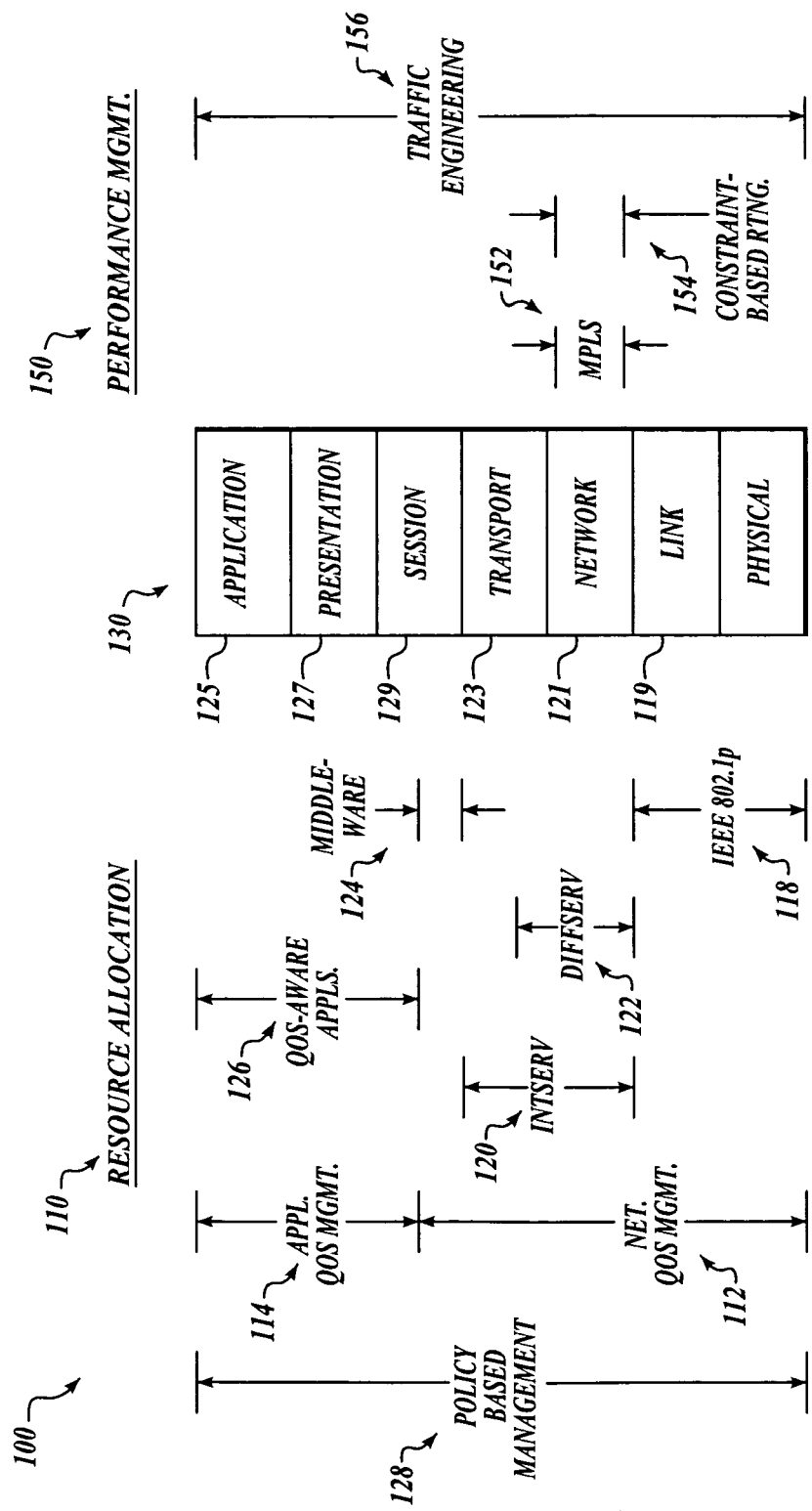
FIG. 1 is a schematic view of a plurality of QoS technologies that may be used to achieve an end-to-end QoS provisioning in accordance with an embodiment of the invention.

Generally speaking, embodiments of the present invention use end-to-end resource allocation to help to ensure that QoS requirements of various traffic flows are at least partially satisfied. FIG. 1 is a schematic view of a plurality of QoS technologies 100 that may be used to achieve an end-to-end QoS provisioning in accordance with embodiments of the present invention. The QoS technologies 100 that enable performance assurance and service differentiation in a network stack 130, such as the Internet, can be broadly classified into two categories: resource allocation 110 and performance management 150. FIG. 1 illustrates resource allocation technologies 110 and performance management QoS technologies 150 and their scope of applicability within the network stack 130.

As shown in FIG. 1, the architectural components of resource allocation 110 may include network QoS management 112, application QoS management 114, and policy based management 116. Network QoS management 112 may include a set of industry standards 118 (e.g., IEEE 802.1p) at a link layer 119, and integrated services 120 and differentiated services 122 at a network layer 121 and a transport layer 123. Application QoS management 114 may include middleware 124 and QoS-aware applications 126 at the application layer 125, presentation layer 127, and session layer 129 of the network stack 130. Finally, policy based management 128 is applicable to all layers of the network stack 130.

One possible objective of performance management 150 is to determine and establish a path that each traffic flow should take in order to maximize the number of end-to-end user application sessions whose QoS requirements have been satisfied while maximizing the overall network utilization. Traditional networks are based on destination-based routing. However, in order to achieve the performance management objectives, the network may preferably have the ability to establish alternate paths for traffic flows between source/destination pairs through efficient provisioning of resources and greater control of the network flows. Thus, as shown in FIG. 1, architectural components of performance management 150 may include Multi-Protocol Label Switching (MPLS) 152 and constraint-based routing 154 at the network layer 121 and traffic engineering 156 that is applicable to all layers of the network stack 130.

Figure 2:
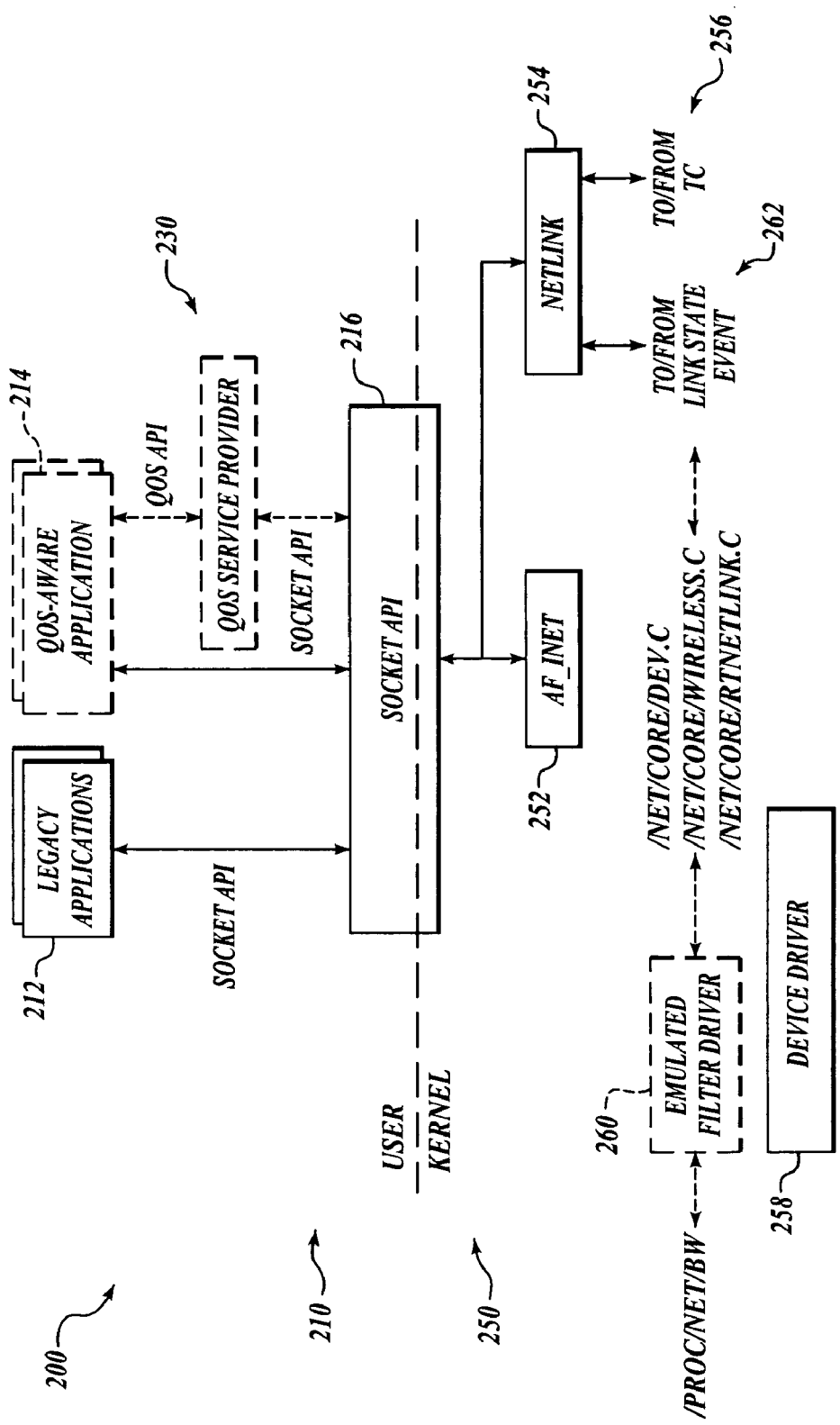
FIG. 2 is a schematic view of a network QoS management architecture in accordance with an embodiment of the invention.

FIG. 2 is a schematic view of a network QoS management architecture 200 in accordance with an embodiment of the invention. In this embodiment, a user mode 210 of the architecture 200 includes a legacy application portion 212 and a QoS-aware application portion 214 coupled to a socket Application Programming Interface (API) 216. Similarly, a kernel portion includes an AF_INET portion 252 and a NETLINK portion 254 also coupled to the socket API 216. A QoS service provider 230 mediates the interactions between the QoS-aware applications 214 and the socket API 216. The QoS service provider 230 offers significant advantages to the QoS-aware applications 214 and the entire system. Those advantages to the QoS-aware applications 214 include an abstract QoS API from any complexity and variations of the Kernel 250, session management for concurrency and synchronization, and common services like monitoring changes to the available bandwidth. Those advantages to the entire system include admission control, adaptation, and resource management for concurrent applications. The functionality and benefits of the QoS service provider 230 are elaborated further in the description below.

As further shown in FIG. 2, the network QoS management architecture 200 also includes components within the user mode 210 and kernel mode 250 portions of the operating system. QoS-aware Applications 214 interact with QoS Service Provider 230 and Socket API 216. QoS-aware Applications 214 establish the session with peer application via QoS Service Provider 230. QoS Service Provider 230 performs session admission control and appropriately performs QoS provisioning for the requested session. Once QoS Service Provider 230 accepts a session connection request from QoS-aware Applications 214, it then establishes socket level session via Socket API 216. Following the establishment of the session between the QoS-aware Applications 214 and the peer application, QoS-aware Applications 214 transmit and receive data via Socket API 216. Legacy applications 212 interact with peer applications by setting up sessions via Sockets API 216. They also transmit and receive data via Socket API 216. Socket API 216 interact with AF_INET 252 and NETLINK 254. Socket level session communication with peer entity is directed to and from AF_INET 252. QoS Service Provider 230 uses the NETLINK 254 to configure and monitor underlying Traffic Control (TC) components 256 such as a scheduler. In one embodiment, the scheduler may be a Differentiated Services (DiffServ) scheduler. In addition, QoS Service Provider 230 also interacts with NETLINK 254 which in turn interacts with the underlying Device Driver 258 via the Emulated Filter Driver 260 to query and obtain Link State Events 262.

In one particular embodiment, the network QoS management architecture 200 includes a standard Differentiated Services (DiffServ) portion. Various Differentiated Services architectures are known and may be suitable for this purpose, including, for example, those architectures generally disclosed in *An Architecture for Differentiated Services* by S. Blake et al., The Internet Society, RFC 2475, December 1998, incorporated herein by reference. Generally, the standard DiffServ portion assumes a stable link bandwidth capacity and interconnectivity state in QoS provisioning, but this is generally not valid within a dynamic ad hoc mobile heterogeneous network environment. Thus, embodiments of the present invention include an extension portion to account for the dynamic link state and bandwidth characteristics in such a dynamic mobile environment, thereby dynamically updating the packet transmit scheduler as link states change.

Figure 3:
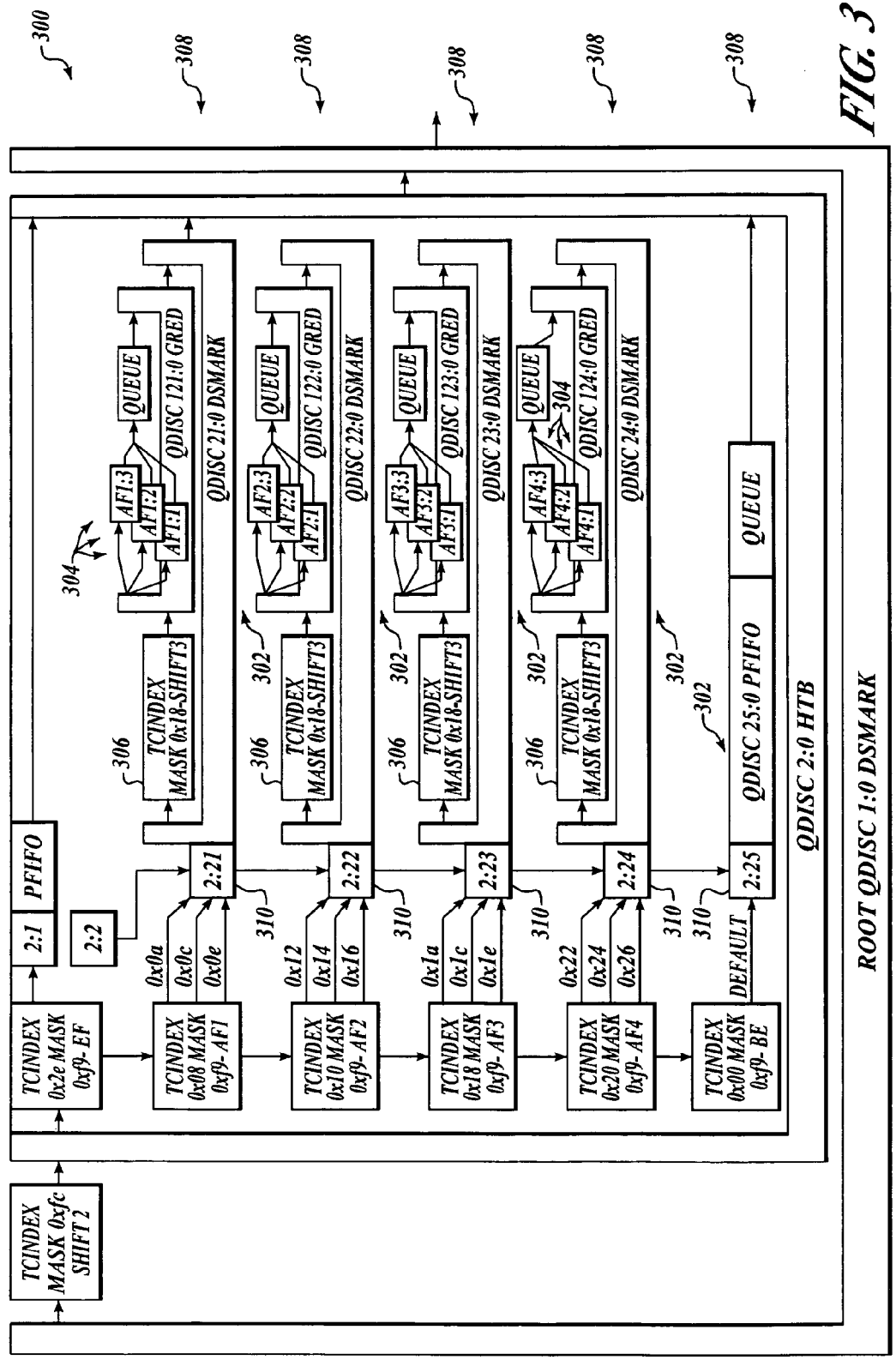
FIG. 3 is a scheduler in accordance with another embodiment of the invention.

FIG. 3 is a representative scheduler 300 in accordance with an embodiment of the invention. In this embodiment, a standard DiffServ portion may be implemented in Linux using the traffic control (TC) elements of queuing disciplines (qdiscs) 302, classes 304, and filters 306. Each network interface 308 may have a qdisc 302 associated with it, which will control how packets are sent over that interface. Some qdiscs 302 are classful and may have multiple classes 304. In order for a qdisc 302 to assign a packet to a particular class 304, filters 306 may be used to classify packets and assign them to the appropriate class 304. In general, a class 304 may have a qdisc 302 attached to it so that elaborate combinations of TC elements can be constructed. A filter 306 may have a policer 310 attached to it that will meter the flow through that policer 310 and produce an action if the flow exceeds a specified rate.

In one particular embodiment, the QoS Service Provider 230 may be adapted to look at local statistics acquired through queries to rtnetlink socket connections. The QoS Service Provider 230 may also request statistics locally or from another host on the network through some mechanism such as an SNMP subagent that implements a DiffServ Management Information Base (MIB). In further embodiments, the QoS Service Provider 230 may provide two main services. A first service is a QoS API function through which QoS-aware applications may request certain levels of QoS for network connections. A second service is a mechanism for the underlying DiffServ implementation to adjust the service rates of its classes based on the available bandwidth as reported by the network device.

The QoS Service Provider 230 may also be implemented as a user-level daemon that listens on a UNIX address family socket (i.e. local socket) for requests from the QoS API and also listens on a netlink address family socket for reported changes to the available bandwidth of the network device. The QoS API function may be implemented as a library of C functions that send the QoS requests from the application to the QoS Service Provider 230 through the local socket. The QoS Service Provider 230 may attempt to map a QoS request to a DiffServ class that will be able to provide the requested level of QoS. If successful, the QoS Service Provider 230 will create a classifier to map the packets of that network connection to the appropriate DiffServ class. The QoS API will then just use the native socket functionality of the operating system to create the actual network connection.

In one embodiment, the QoS Service Provider 230 manages the DiffServ implementation on only one network interface and does not check that the QoS API connection actually goes through the monitored interface. In alternate embodiments, the QoS Service Provider 230 is adapted to manage multiple network interfaces. The QoS Service Provider 230 may be adapted to process Transmission Control Protocol (TCP) connections, User Datagram Protocol (UDP) connections, or any other suitable protocols and connections.

As noted above, embodiments of the present invention include an extension portion to account for the dynamic link state and bandwidth characteristics in a dynamic mobile environment, thereby dynamically updating the packet transmit scheduler as link states change. The extension portion is adapted to modify the service rates of its classes based on the bandwidth available to the network device. This is especially important for wireless devices. The problem can be divided into two parts. The first part is how the device notifies the kernel mode 250 of the new bandwidth. The second part is how the kernel mode 250 effects changes in the standard DiffServ portion based on the new bandwidth. Device notification to the kernel mode 250 of the new bandwidth may be accomplished by the specific device driver associated with the given interface.

Regarding the second part of the problem, how the kernel mode 250 effects changes in the standard DiffServ portion based on emulated new bandwidth updates, a hierarchical token bucket (HTB) qdisc may be used as a scheduler with a plurality of classes. The plurality of classes may include a separate HTB class for each DiffServ class of expedited forwarding (EF), the four classes of assured forwarding (AF1, AF2, AF3, AF4), and best effort (BE). Each class may be assigned a guaranteed rate and a maximum rate. In addition, the filters that classify packets into the various classes can have policers attached to them that meter the flows going into particular classes in order to perform such actions as dropping or marking. Each policer has a specified rate. The specified rates may be specified as absolute values. In a static environment the network administrator can simply divide up the available bandwidth, as per local policy. However, in a dynamic environment, the sum of the rates of the service classes may be unequal to the bandwidth actually available to the network device at least some of the time.

In one embodiment, the HTB class for EF is a class of the HTB qdisc, while all the other classes are subclasses of another class of the HTB qdisc at the same level of the EF class. This may be done to isolate the EF class from the other classes, while allowing the other classes to borrow bandwidth from each other if they are not being used. In preferred embodiments, the EF class has the highest priority, the AF classes have the next highest priority and the BE class has the lowest priority. Thus, the AF classes get the first use of any unused bandwidth and the BE class gets to borrow any extra bandwidth only if the AF classes are not using it.

The architecture 200 may be adapted to perform a notification of a user-level daemon program by the kernel mode (or kernel portion) 250 that the available bandwidth has changed, and may be further adapted to perform a calculation of new rates for the HTB classes and the policers based on the new bandwidth and the update of the corresponding TC elements in the kernel mode 250 by way of rtnetlink sockets. In one embodiment, the notification of the user-level daemon of the change in bandwidth is performed using the NETLINK_ROUTE family of the AF_NETLINK socket protocol, a socket protocol generally known in the relevant art. The AF_NETLINK protocol may be used to transfer information between kernel modules and user space processes. The AF_NETLINK protocol also has a broadcast capability. More specifically, the daemon process may open a NETLINK_ROUTE socket and, when binding to that socket, may specify that it wishes to receive broadcast information on an RTMGRP_LINK group. The kernel mode 250 may then send a broadcast message to the RTMGRP_LINK group whenever the link status has changed on a network device. A bandwidth component may be added to the broadcast message.

In the event that it is desirable to emulate a change in link status as if it was reported by the network device through the device driver, a file in a /proc file system may be used. In one embodiment, files in the /proc file system are simply linked to functions in the kernel mode 250 that are executed whenever any user-level process reads from one of the /proc files. The functions in the kernel mode 250 may return data from the kernel mode 250 as if the data were in the files. In one particular embodiment, a file /proc/net/bw-eth1 may be implemented with a function that will change the reported bandwidth value periodically as well as call the netlink function that initiates the broadcasts to the RTMGRP_LINK group. In alternate embodiments, the /proc file system based mechanism may be implemented to emulate dynamic changes in link state, or alternately, the device driver 258 (FIG. 2) will monitor the actual links state 262 and report updates.

In operation, a user-level daemon may initially read a configuration file that specifies the percentages of available bandwidth that are to be allocated to each DiffServ class, the DiffServ class to HTB class mapping, a list of policers and their percentages, and a list of which filters are using which policers. The daemon may then request to be notified of RTMGRP_LINK group messages. When the daemon receives notification of a bandwidth change through the netlink socket, it may recalculate all of the rates, and may make changes to the appropriate qdiscs and filters in the kernel mode 250 by way of rtnetlink sockets. The daemon may also notify any application that has requested to be notified of any change in the link status as described more fully below.

In one embodiment, the architecture 200 includes a link state change notification capability. As mentioned above, the AF_NETLINK socket protocol has a broadcast capability. A broadcast function in /usr/src/linux/net/core/rtnetlink.c that performs a broadcast for the RTMGRP_LINK group is, in one embodiment, designated as rtmsg_ifinfo. The broadcast function first calls a rtnetlink_fill_ifinfo function and then calls a netlink_broadcast function to send the message to all processes listening to the RTMGRP_LINK group. The rtnetlink_fill_ifinfo function retrieves data from the netdevice data structure and fills in the socket message buffer. It also uses the message tags IFLA_*, such as IFLA_ADDRESS, IFLA_MTU, etc., to indicate what data is being returned in the socket message buffer. These tags are defined in a folder, such as /usr/src/linux/include/linux/rtnetlink.h. A flag tag IFLA_UNSPEC may be used to return the new bandwidth value. The new bandwidth value may be stored in the netdevice data structure, or alternately, it may be stored in a new global variable, such as a global variable called bandwidth_for_our_test. This variable may, for example, be set by the function tied to the /proc/net/bw-eth1 file. Another function, designated as bw_get_info, may return the value of bandwidth_for_our_test whenever /proc/net/bw-eth1 is read. It may also have a counter that causes it to toggle the value of bandwidth_for_our_test. In one particular embodiment, for example, the bw_get_info function may toggle between 10 Mbps and 100 Mbps every twenty reads. Whenever the bw_get_info function changes the value of bandwidth_for_our_test, it may also call another function designated rtmsg_ifinfo in order to initiate an RTMGRP_LINK group broadcast message. A perl script may be adapted to periodically drive the changes, for example, at 1 second intervals.

The architecture 200 may be adapted to perform a traffic control function. In one embodiment, when the user-level daemon program starts, the Linux Traffic Control (TC) elements may have no concept of the different DiffServ classes, so the architecture 200 must be told which HTB classes represent which DiffServ classes. The architecture 200 may also need to be told what percentage of available bandwidth is to be allocated to the different DiffServ classes, as well as what percentages to use for the different policers and which filters use which policers. The information about filters may be necessary since the parameters of the policers may not be changeable. In one embodiment, rates may be changed by changing the filters and attaching a new policer to the new filters with the newly calculated rates, effectively discarding the old policers.

After reading in the configuration information, the daemon may open a socket connection with the AF_NETLINK socket protocol and then may bind to that socket after setting the nl_groups field in the sockaddr_nl data structure to RTMGRP_LINK group. The daemon may then listen to the socket, using select, and may wait for any broadcast message. After receiving a link-change message, the program may retrieve the new bandwidth value from the netlink message buffer and may recalculate the rates for the HTB classes and policers based on the percentages defined in the configuration file. All the necessary information may then be put into netlink message buffers and sent to the TC elements in the kernel mode 250 by way of a netlink socket.

The architecture 200 may be further adapted to allow QoS-aware applications to call a set of QoS enhanced Socket functions for QoS provisioning, which may, in turn, use the standard BSD Socket functions for the actual network connection. Based on the information in a QoS request from the QoS-aware application, the QoS Service Provider 230 will map the connection to the appropriate QoS provisioning mechanism. For example, if the underlying QoS mechanism is DiffServ, the QoS Service Provider 230 may set up TC configurations in order to route packets from that connection into the assigned DiffServ class, and may perform DSCP marking based on the configuration associated with a given tuple space. The QoS Service Provider 230 may also be adapted to provide notification to remote applications when network resource conditions change.

The QoS Service Provider 230 may be further adapted to use the QoS API functions to send strings to and from a server, in order to illustrate the use of the API and verify that the QoS API functions are performing correctly. In one particular embodiment, for example, an FTP client in the generally-known netkit-ftp-0.17 may be modified to call the QoS API functions.

As described above, the QoS Service Provider 230 may listen on an AF_UNIX socket, waiting on messages from applications using the QoS API. Upon receiving a request, the QoS Service Provider 230 may attempt to satisfy the request and then return success or failure. The QoS Service Provider 230 may also be adapted to map a request to a DiffServ class in the underlying DiffServ implementation. It could be enhanced to use IntServ as well, using some runtime option to decide which mechanism to use. The QoS-aware application would be unaware which QoS provisioning mechanism was being used.

In one aspect, a QSocket function creates an endpoint for communication and returns a file descriptor on success, or −1 if an error occurred. The QSocket function may open a standard socket and send a request message to the QoS Service Provider 230, which may include the file descriptor of the socket, the process id of the application, and the parameters in the qos_info structure. The QoS Service Provider 230 may use the file descriptor of the socket and the process id of the application as the unique index for this connection. Since the socket call does not specify an endpoint, the QoS Service Provider 230 cannot map this connection to a DiffServ class yet, so it merely creates a soft state for this connection and saves the parameters in the qos_info structure.

In one particular embodiment, a QConnect function connects to a specific host and port combination and returns a zero on success, or −1 if an error occurred. The QConnect function may call the standard connect function which may assign a local address and port number. The QConnect function may then call getsockname to retrieve the assigned local address and port number. The destination address and port number are retrieved from the sockaddr structure. The QConnect function may finally send a setup message to the QoS Service Provider 230, which consists of the file descriptor of the socket, the process id of the application, the local address and port, and the destination address and port. The QoS Service Provider 230 may then analyze the DiffServ status on the network interface for this connection. The QoS Service Provider 230 may first consider the value of the qosmech field in the qos_info structure that was stored in the call to QSocket, which may have the value of QOS_ANY, QOS_DIFFSERV, or QOS_INTSERV. If the qosmech field has the value of QOS_ANY, the QoS Service Provider 230 may consult two parameters in the flow_spec substructure of the qos_info structure. If there is a latency requirement, the QoS Service Provider 230 attempts to map this connection to the EF class. The QoS Service Provider 230 compares the rate requirement to what is available for that class (allocated rate minus current usage). If there is not a latency requirement, the QoS Service Provider 230 attempts to map this connection to an AF class in the same way as for the EF class. If the qosmech field has the value of QOS_DIFFSERV, the QoS Service Provider 230 will attempt to map this connection to the DiffServ class as specified in the diffservclassrequest field of the qos_info structure in the same manner as described above. In one particular embodiment, the QOS_INTSERV mechanism may be treated in the same manner as QOS_ANY. If the request is successfully mapped to a DiffServ class, the QoS Service Provider 230 may then create a TC filter to map packets for this connection to the HTB class that represents the selected DiffServ class and return success to the QConnect function. If the QoS Service Provider 230 is unsuccessful, it returns failure to the QConnect function, which will close the socket and return an error.

A QChange function updates the QoS information associated with an existing file descriptor and returns a zero on success, or −1 if an error occurred. The QChange function may attempt to map the request to a DiffServ class as described in the QConnect function. If successful, the QChange function may have been mapped to the same class or a different class. If unsuccessful, the QChange function will retain the current mapping.

A QClose function closes the associated file descriptor created via a QSocket function and returns a zero on success, or −1 if an error occurred. The QClose function will close the standard socket and send a clear request to the QoS Service Provider 230, which includes the file descriptor of the socket and the process id of the application. The QoS Service Provider 230 may free all memory associated with this connection, delete the TC filter for it, and, if the application had requested any notifications, may remove the message queue to that application and any pending event notifications.

A QAttach function may associate an existing socket file descriptor with QoS information and may return a zero on success, or −1 if an error occurred. A QSendto function may send a message over an existing QSocket to a peer and returns the number of bytes sent on success, or −1 if an error occurred. A QSend function sends a message over an existing QSocket in connected state to a peer and returns the number of bytes sent on success, or −1 if an error occurred. The QSend function will directly call the standard Send function.

A QStateUpdateNotification function sets a callback function and returns a zero on success, or a −1 if an error occurred. The QStateUpdateNotification function will send a callback message to the QoS Service Provider 230, which may include a file descriptor of the socket, a process id of the application, and an event type from the notification_type structure. The QoS Service Provider 230 will add this request to the pending event list. The QStateUpdateNotification function may add the file descriptor, event type, context block, and callback function to its pending event list. When there is an event of that type, the QoS Service Provider 230 may remove the notification from the pending event list, create a message queue for the application process and put a message on the queue. In one particular embodiment, every function in the QoS API immediately checks to see if there are any messages on its message queue. If there are, then the function reads each message, matches it up with the appropriate entry in it pending event list, removes that entry, and calls the designated callback function.

A QStatus function retrieves status information associated with an existing file descriptor and returns a zero on success, or −1 if an error occurred. The QStatus function will send a status message to the QoS Service Provider 230, which may include the file descriptor of the socket and the process id of the application. The QoS Service Provider 230 may retrieve the current statistics from the DiffServ implementation and may return the data to the QStatus function, which fills in values of the qos_status structure.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of managing a network having a plurality of interfaces, comprising:
    controlling how a packet is passed over at least one of the interfaces using a differentiated services portion of a network management architecture;
    updating a packet transmit scheduler after a link state change, including:
    monitoring a request for a Quality of Service (QoS) level from at least one QoS-aware application, the QoS-aware application to request the QoS level for network connections and report updates of the QoS level;
    adjusting at least one service rate of packet travel controlled by the differentiated services portion based on the requested QoS level and an available bandwidth; and
    providing a notification of the link state change.

2. The method of claim 1, wherein controlling how a packet is passed over at least one of the interfaces includes using at least one of a queuing discipline, a class, and a filter.

3. The method of claim 1, wherein adjusting at least one service rate of packet travel includes notifying a kernel portion of a variation in the available bandwidth, and effecting a change in control of the packet rate of travel by the differentiated services portion.

4. The method of claim 1, wherein adjusting at least one service rate of packet travel includes scheduling a plurality of service rates using a queuing discipline.

5. The method of claim 4, wherein scheduling a plurality of service rates includes scheduling an expedited forwarding (EF) class for each differentiated services class of expedited forwarding, scheduling a plurality of assured forwarding (AF) classes, and scheduling a best effort (BE) class.

6. The method of claim 5, wherein the EF classes have a highest priority, the AF classes have an intermediate priority, and the BE class has a lower priority.

7. The method of claim 4, wherein scheduling a plurality of service rates includes scheduling a guaranteed rate and a maximum rate for each class of a plurality of classes.

8. The method of claim 1, further comprising notifying a user-level daemon program of a variation in the available bandwidth.

9. The method of claim 8, further comprising changing at least one of a service rate, a queuing discipline, and a filter by the user-level daemon program.

10. The method of claim 1, wherein providing a notification of a link state change includes a broadcast function that uses message tags to indicate data that is being returned in a socket message buffer.

11. The method of claim 1, wherein adjusting at least one service rate of packet travel controlled by the differentiated services portion includes calling at least one QoS enhanced socket function for QoS provisioning.

12. A method, comprising:
    controlling how a packet is passed over a network using a differentiated services portion of a network management architecture;
    monitoring network link state:
    monitoring a request for a Quality of Service (QoS) level from at least one QoS-aware application;
    adjusting at least one service rate of packet travel controlled by the differentiated services portion by mapping a connection to an appropriate QoS provisioning mechanism, the adjustment to the service rate of packet travel based on change in network link state and the requested QoS level and an available bandwidth; and
    providing a notification of the change in link state.

13. The method of claim 12, wherein mapping a connection to an appropriate QoS provisioning mechanism includes mapping a connection using a QSocket function configured to create an endpoint for communication.

14. The method of claim 12, wherein mapping a connection to an appropriate QoS provisioning mechanism includes mapping a connection using a QConnect function configured to connect to a specific host and port combination.

15. The method of claim 12, wherein mapping a connection to an appropriate QoS provisioning mechanism includes mapping a connection using a QChange function configured to update a QoS information associated with an existing file descriptor.

16. The method of claim 12, wherein mapping a connection to an appropriate QoS provisioning mechanism includes mapping a connection using a QClose function configured to close an associated file descriptor.

17. The method of claim 12, wherein mapping a connection to an appropriate QoS provisioning mechanism includes mapping a connection using a QAttach function configured to associate an existing socket file descriptor with QoS information.

18. The method of claim 12, wherein mapping a connection to an appropriate QoS provisioning mechanism includes mapping a connection using a QStateUpdateNotification function configured to set a callback function.

19. The method of claim 12, wherein mapping a connection to an appropriate QoS provisioning mechanism includes mapping a connection using a Q Status function adapted configured to retrieve a status information associated with an existing file descriptor.

* * * * *